(12) United States Patent
Makino

(10) Patent No.: US 8,792,139 B2
(45) Date of Patent: Jul. 29, 2014

(54) IMAGE PROCESSING APPARATUS AND METHOD OF CONTROLLING SAME

(75) Inventor: Yoichiro Makino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/332,191

(22) Filed: Dec. 20, 2011

(65) Prior Publication Data

US 2012/0162675 A1   Jun. 28, 2012

(30) Foreign Application Priority Data

Dec. 28, 2010 (JP) ................. 2010-293022

(51) Int. Cl.
*G03F 3/08* (2006.01)
*G06T 5/00* (2006.01)
*H04N 1/407* (2006.01)
*H04N 1/38* (2006.01)
*H04N 1/409* (2006.01)
*H04N 1/393* (2006.01)

(52) U.S. Cl.
CPC ............. *H04N 1/38* (2013.01); *H04N 1/393* (2013.01); *H04N 1/407* (2013.01); *H04N 1/409* (2013.01); *H04N 2201/0434* (2013.01); *G06T 2207/20204* (2013.01); *G06T 5/002* (2013.01)
USPC .......... 358/3.26; 358/1.9; 358/3.27; 358/518; 358/521; 358/520; 358/463

(58) Field of Classification Search
CPC .................................. H04N 1/38; G06T 5/00
USPC ........ 358/1.9, 2.1–3.02, 3.26–3.27, 518–523, 358/532–533; 382/205, 254, 266
See application file for complete search history.

(56) References Cited

U.S. PATENT DOCUMENTS

| | | | | |
|---|---|---|---|---|
| 5,940,544 A * | 8/1999 | Nako | ............................. | 382/293 |
| 5,969,829 A * | 10/1999 | Matsuda et al. | ............. | 358/475 |
| 6,330,050 B1 * | 12/2001 | Takahashi et al. | .............. | 355/25 |
| 6,822,690 B2 * | 11/2004 | Iida | ................ | 348/364 |
| 7,016,536 B1 * | 3/2006 | Ling et al. | ..................... | 382/190 |
| 7,072,527 B1 * | 7/2006 | Nako | ............................ | 382/290 |
| 7,483,564 B2 * | 1/2009 | Jia | ................... | 382/154 |
| 7,693,329 B2 * | 4/2010 | Chelvayohan et al. | ....... | 382/173 |
| 7,733,548 B2 * | 6/2010 | Makino et al. | ................ | 358/520 |
| 7,826,660 B2 * | 11/2010 | Saquib et al. | ................. | 382/167 |

(Continued)

FOREIGN PATENT DOCUMENTS

| | | |
|---|---|---|
| JP | 2003-69824 A | 3/2003 |
| JP | 2008-54289 A | 3/2008 |

*Primary Examiner* — Richard Zhu
(74) *Attorney, Agent, or Firm* — Canon USA Inc IP Division

(57) ABSTRACT

An image correcting method for an image processing apparatus that reads a bound document and corrects a shadow in a bound portion in obtained document image data includes extracting shadow image data from the document image data, generating a grid with which a ratio of changes in luminance between the grid lines in directions perpendicular to each other is smaller than in a square grid and which has grid points within a capacity of a memory for correction values, calculating first correction values that corrects luminance of pixels in the shadow image data corresponding to grid points, storing the first correction values in the memory, calculating second correction values for luminance of the pixels in the shadow image data based on first correction values of grid points close to each pixel, and correcting luminance of the document image data using the first and second correction values.

18 Claims, 10 Drawing Sheets

(56) References Cited

U.S. PATENT DOCUMENTS

| | | | |
|---|---|---|---|
| 2003/0231802 A1* | 12/2003 | Sekino et al. | 382/274 |
| 2005/0093865 A1* | 5/2005 | Jia | 345/426 |
| 2006/0269111 A1* | 11/2006 | Stoecker et al. | 382/128 |
| 2007/0092132 A1* | 4/2007 | Sato et al. | 382/154 |
| 2008/0024845 A1* | 1/2008 | Makino et al. | 358/538 |
| 2009/0086275 A1* | 4/2009 | Liang et al. | 358/3.21 |
| 2009/0214133 A1* | 8/2009 | Aoyama | 382/268 |
| 2010/0202027 A1* | 8/2010 | Makino et al. | 358/520 |

* cited by examiner

FIG. 3A

| 1 | 0 | -1 |
|---|---|----|
| 1 | 0 | -1 |
| 1 | 0 | -1 |

FIG. 3B

| 1  | 1  | 1  |
|----|----|----|
| 0  | 0  | 0  |
| -1 | -1 | -1 |

FIG. 3C

| 1 | 1 | 0 | -1 | -1 |
|---|---|---|----|----|
| 1 | 1 | 0 | -1 | -1 |
| 1 | 1 | 0 | -1 | -1 |
| 1 | 1 | 0 | -1 | -1 |
| 1 | 1 | 0 | -1 | -1 |

FIG. 3D

| 1  | 1  | 1  | 1  | 1  |
|----|----|----|----|----|
| 1  | 1  | 1  | 1  | 1  |
| 0  | 0  | 0  | 0  | 0  |
| -1 | -1 | -1 | -1 | -1 |
| -1 | -1 | -1 | -1 | -1 |

IMAGE PROCESSING APPARATUS AND METHOD OF CONTROLLING SAME

BACKGROUND OF THE INVENTION

1. Field of the Invention

The present invention relates to a method for processing an image, by which image data read by an image reading apparatus such as an image scanner, a copying machine, or a multifunction peripheral is corrected.

2. Description of the Related Art

Currently, when a document that has been bound by saddle stitching, such as a book or a magazine, is read or copied, the document is opened and disposed on a transparent document table of an image scanner, a copying machine, or the like such that a surface to be read or copied faces downward and an image is read from below the document table. A method for processing the image at this time has been disclosed in Japanese Patent Laid-Open No. 2008-54289 and Japanese Patent Laid-Open No. 2003-69824, by which a shadow generated in a bound portion around a boundary between left and right pages of the document, which has been opened and disposed on the document table, is subjected to luminance correction through image processing.

In Japanese Patent Laid-Open No. 2008-54289, however, luminance correction value tables are obtained at two positions that are distant from each other in the vertical direction of the bound portion and a luminance correction value table at an arbitrary position is calculated from the two tables through interpolation calculation. That is, luminance correction values at all pixel positions need to be calculated for each line of an image to be corrected. Therefore, while the quality of an image after the correction is high, a circuit is large in terms of installation of the circuit in a copying machine or a multifunction peripheral (hereinafter referred to as the MFP) in order to perform correction of a shadow during a copying operation, thereby increasing the cost.

In addition, in the example of the related art disclosed in Japanese Patent Laid-Open No. 2003-69824, an appropriate method for determining the size and the aspect ratio of a plurality of blocks that are obtained by dividing a read image and that perform a process for correcting luminance using the value of luminance of a pixel having a largest value of luminance among pixels included in each block as a representative value of each block is not disclosed. Therefore, the correction value table is not effectively used and optimization of the quality of a corrected image is not performed.

SUMMARY OF THE INVENTION

According to one aspect of the present invention, a method for processing an image according to an aspect of the present invention is a method for correcting an image used by an image processing apparatus that corrects a shadow in a bound portion included in document image data obtained by reading a bound document. The method includes the steps of extracting shadow image data including a region of the shadow from the document image data, generating, for the shadow image data by determining intervals between grid lines, a grid with which a ratio of changes in luminance between the grid lines in directions that are perpendicular to each other is smaller than in a case of a square grid and that has the number of grid points that can be stored in a capacity of a memory for correction values, calculating first correction values that correct luminance of pixels in the shadow image data corresponding to grid points of the grid, storing the first correction values in the memory, calculating second correction values for luminance of the pixels in the shadow image data on the basis of first correction values of grid points that are close to a position of each pixel, the first correction values being stored in the memory, and correcting luminance of the document image data using the first correction values and the second correction values.

Therefore, according to an aspect of the present invention, even in the case of a bound document in which a photograph or a figure is arranged in a background portion or that has color printing, irregularity in luminance caused by a shadow in a bound portion is appropriately corrected while leaving the figure or the photograph as it is and a correction value memory is used more effectively.

Further features of the present invention will become apparent from the following description of exemplary embodiments with reference to the attached drawings.

BRIEF DESCRIPTION OF THE DRAWINGS

FIGS. 3A to 3D are diagrams illustrating weighting coefficients for calculating the characteristics of the amount of correction in square blocks.

DESCRIPTION OF THE EMBODIMENTS

Embodiments of the present invention will be described hereinafter in detail. In the present invention, a shadow in a bound portion is divided into rectangular blocks in accordance with grid lines that are perpendicular to each other and that are parallel to main scanning and sub-scanning, respectively, in reading of a bound document or parallel to a column direction and a row direction, respectively, of pixels of document image data. In general, a bound document disposed on a document table has an inclination. Therefore, from between two sets of grid lines that are perpendicular to each other, the direction of a set of grid lines having a smaller angle relative to the direction of a seam is called the "direction of grid lines along the seam" in the following description.

First Embodiment

Figure 9:
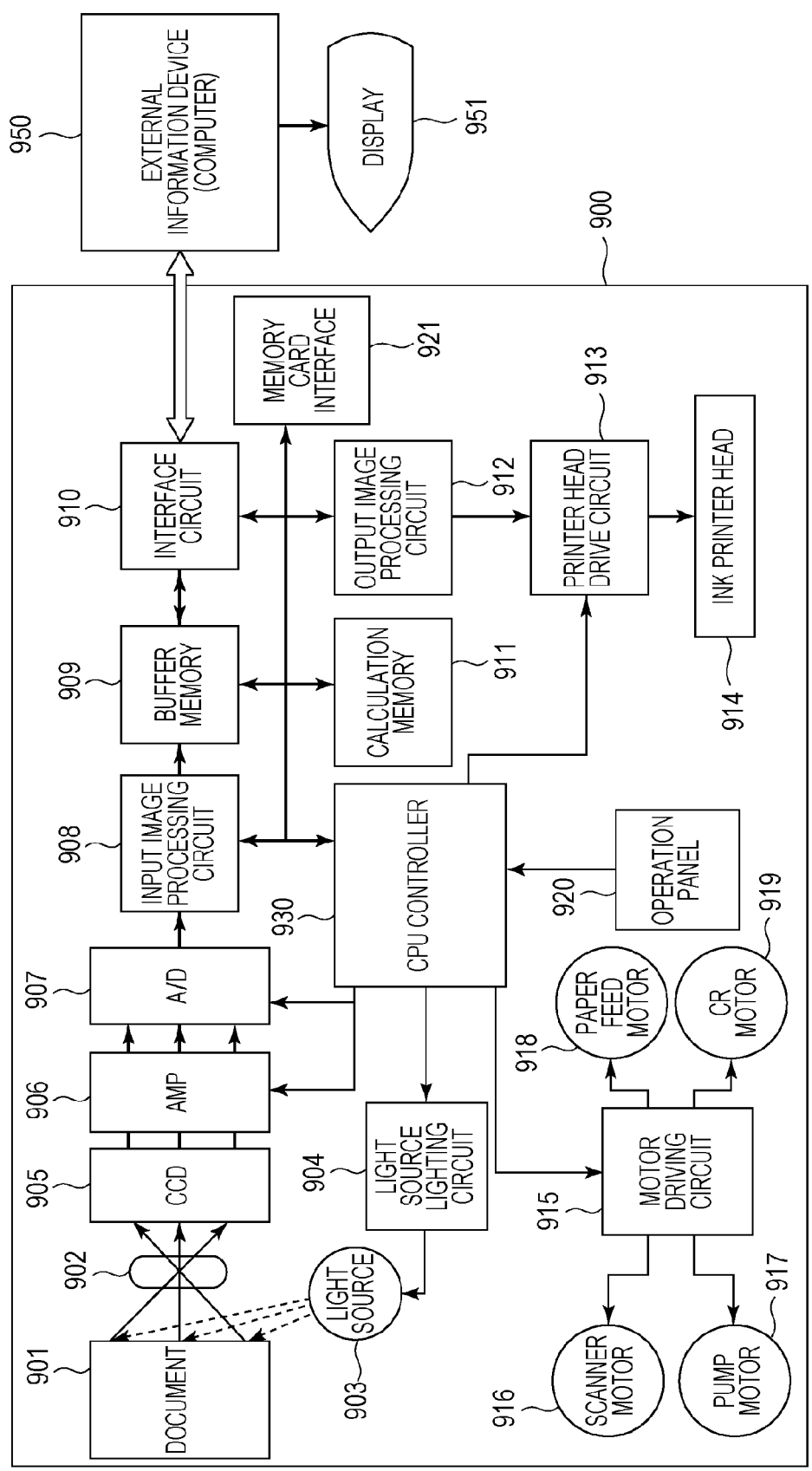
FIG. 9 is a block diagram illustrating the configuration of an MFP that performs a process for correcting a shadow in the bound portion in the present invention.

A first exemplary embodiment of the present invention will be described hereinafter with reference to diagrams and flowcharts. FIG. 9 is a block diagram illustrating an example of the configuration of a multifunction printer or an MFP, which is an image processing apparatus that performs a process for correcting a shadow in the bound portion in the present invention and that has a reading unit and a printing unit for images that are combined with each other. Upon receiving a copying operation start instruction from an operation panel 920, a central processing unit (CPU) controller 930 controls a light source lighting circuit 904 to illuminate a document 901 with a light source 903. At the same time, a scanner motor 916 is driven by a motor driving circuit 915 to move, in a sub-scanning direction, a reading carriage, which is not illustrated, on which the light source 903 and an image sensor 905 are mounted. An image formed on the image sensor 905 by a lens 902 is converted into an electric signal. An analog signal output from the image sensor 905 is transmitted to an amplifier 906 and an analog-to-digital (A/D) converter 907 and converted into digital image data. The digital image data is transmitted to an input image processing circuit 908 and subjected to a process for correcting luminance of a shadow in a bound portion, which will be described in detail later. An image after the correction is temporarily saved to a buffer memory 909. The above-described process is performed by the reading unit for images.

Next, a process performed by the printing unit will be described. The corrected image saved to the buffer memory 909 is subjected to a process according to the characteristics of a printing head or the like performed by an output image processing circuit 912 and converted, by a printing head driving circuit 913, into a printing operation of each nozzle of an ink printing head 914 having a plurality of nozzles. Meanwhile, a paper feed motor 918 intermittently drives printing sheets by the length of the ink printing head, and a carriage motor 919 drives, in a reciprocating manner in a direction perpendicular to the direction in which the printing sheet is driven, a head carriage, which is not illustrated, on which the ink printing head is mounted. In synchronization with the movement of the head carriage and the feeding of the printing sheets, ink is ejected from the printing head and the image subjected to the correction of the shadow is printed.

If there has been an instruction to save a read image, the image is transmitted from the buffer memory 909 to a memory card interface 921. If an instruction to perform a reading operation has been received from an external information device 950 through an interface circuit 910, the image after the correction that has been temporarily saved to the buffer memory 909 in the same manner as in the copying operation is transmitted by the interface circuit 910.

Figure 10:
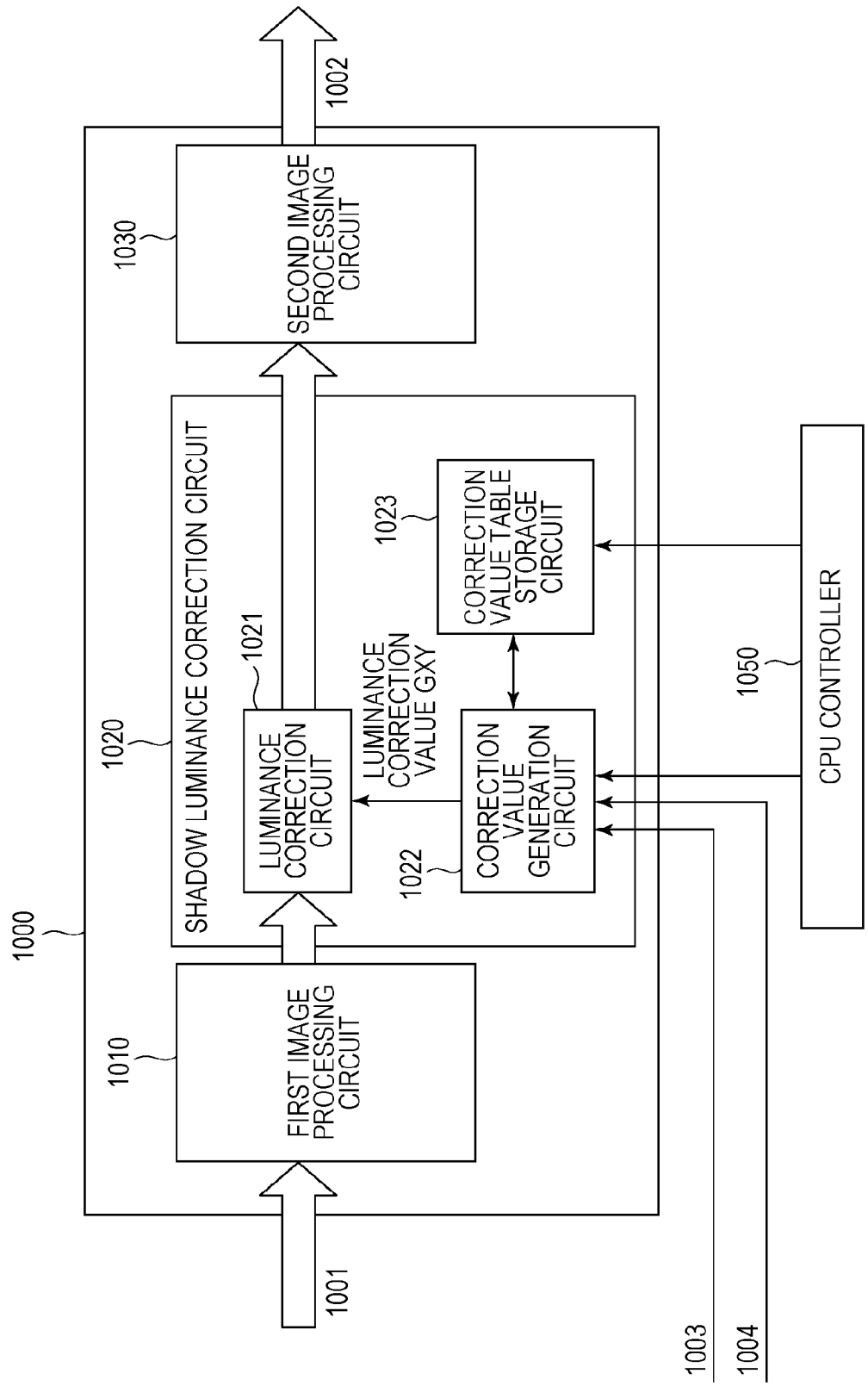
FIG. 10 is a block diagram illustrating an image processing circuit that performs the process for correcting a shadow in the bound portion in the present invention.

FIG. 10 is a block diagram illustrating the internal configuration of an input image processing circuit 1000. Upon receiving input image data 1001, a first image processing circuit 1010 corrects irregularity in the luminance of illumination and pixel dispersion characteristics of the image sensor 905 and converts the color space. The input image data 1001 is then input to a shadow luminance correction circuit 1020. Shadow luminance correction values calculated by the CPU controller 930 by analyzing a shadow in the bound portion before the main operation of copying or the main scanning operation is saved to a memory of a correction value table storage circuit 1023 by the CPU controller 930, which is a control unit.

During the reading operation, a correction value generation circuit 1022 refers to a correction value table to calculate the correction value of certain coordinates in accordance with main scanning pixel positional information CX 1003 and sub-scanning pixel positional information CY 1004 that vary in synchronization with the input image data 1001. In this calculation, a conversion for causing the intervals between grid points at a time when the correction value table is created to match the resolution in the main scanning is performed, while an interpolation process calculation is being performed on the basis of the correction values of grid points that serve as the four corners of a correction process block. Upon receiving a calculated luminance correction value GXY, a luminance correction circuit 1021 performs, on the image data, luminance correction that suits the luminance of the shadow at a pixel position (CX, CY) and transmits data after the correction to a second image processing circuit 1030.

The luminance correction circuit 1021 performs the correction using a configuration in which an arithmetic operation process is performed using known input image data and the luminance correction value GXY or a configuration in which a plurality of luminance correction tables that have been experimentally created in advance through examination of correction effects are switched in accordance with the luminance correction value GXY. The second image processing circuit 1030 performs processes such as a process for changing the size of the image in accordance with the objective of the use and transmits the image data as output image data 1002 from the input image processing circuit 1000.

Next, the mechanism of correction of a shadow in the bound portion will be described with reference to FIG. 2. First, pre-scanning is performed (201) in which the entire surface of the document table is read at low resolution prior to a main scanning operation, which is performed at target resolution. The resolution in the pre-scanning is experimentally determined in advance based on the time required to temporarily save uncompressed image data of the entire surface of the document table to a memory, to detect the range of the document, and to perform a process for analyzing the detection accuracy of the correction of the shadow in the bound portion. Next, the range of the document is extracted (202) using the image of the entire surface of the document table obtained through the pre-scanning in order to identify the range of the document. By analyzing the luminance distribution in the detected range of the document, whether or not there is a shadow in the bound portion, the direction of the shadow, and the correction value of the luminance of the shadow in each pixel position are obtained (203).

The shadow in the bound portion is obtained by analyzing a waveform obtained by focusing upon pixels that can be regarded as ground pixels of the image data, by accumulating, for each main scanning line, changes in the luminance between pixels adjacent to each other in the sub-scanning direction, and by adding up the accumulated values in the sub-scanning direction. For this process, an analysis method that has already been disclosed by the present applicant in Japanese Patent Laid-Open No. 2008-54289 is used. Here, a correction value by which the luminance of each pixel of the image data read for the correction is to be multiplied is calculated. As a result of a judgment as to whether or not there is a region of a shadow in the bound portion using results of the analysis (204), if it has been judged that there is no shadow that requires luminance correction, the shadow luminance correction circuit 1020 is set such that correction will not be performed (209).

Figure 8:
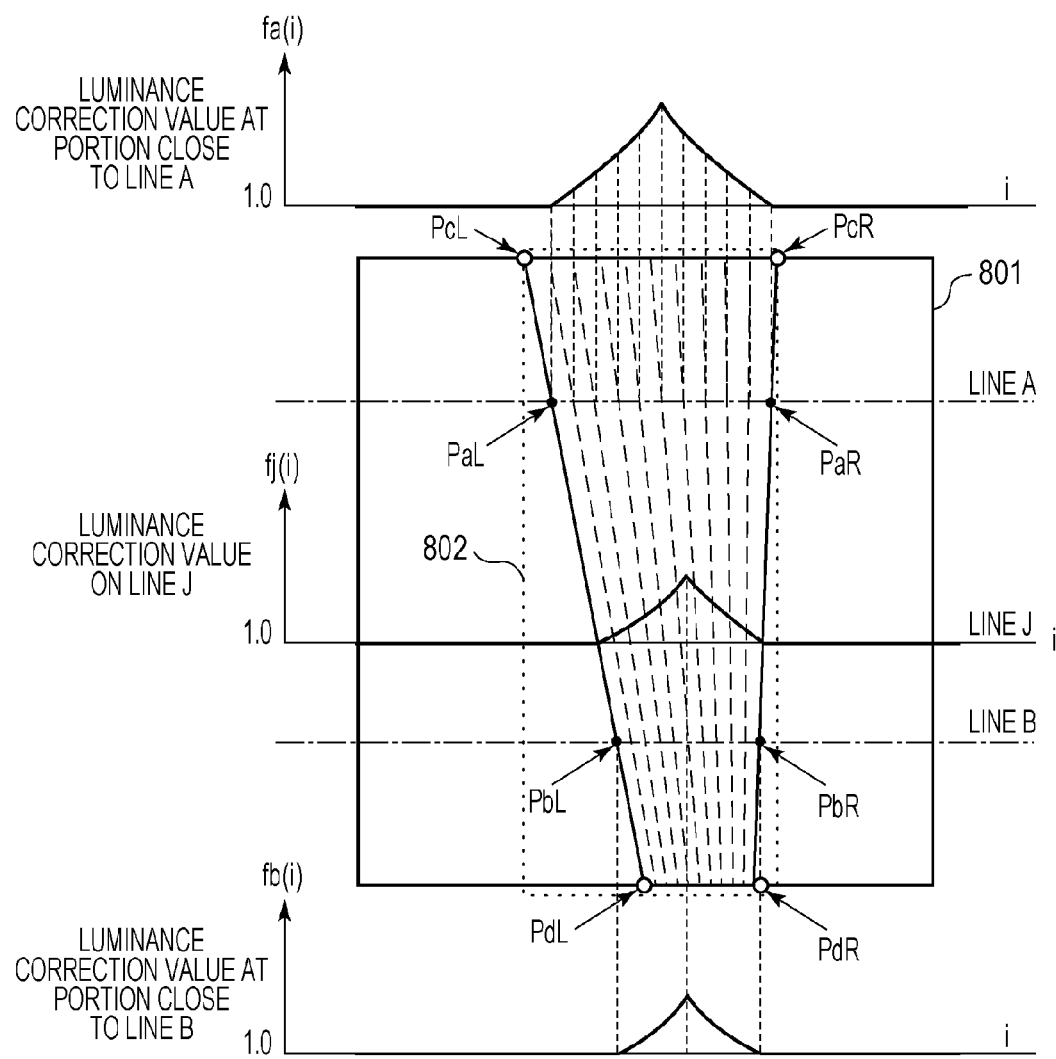
FIG. 8 is a diagram that illustrates the distribution of luminance correction values in order to describe a method for calculating a range in which a shadow is corrected.

If it has been judged in step 204 that there is a region of a shadow region in the bound portion that requires luminance correction, shadow image data in a range in which correction of the luminance of the shadow is to be performed is extracted (205). Calculation of the range in which the luminance of the shadow is to be corrected on the basis of the correction values for the shadow obtained in step 203 will be described with reference to FIG. 8. FIG. 8 illustrates an example of luminance correction value information for a bound portion in which there is a large upward gap around the center of a document region 801. By using the technique disclosed in Japanese Patent Laid-Open No. 2008-54289, luminance correction value tables fa(i) and fb(i) in portions close to Line A and Line B, respectively, which are two positions distant from each other in the vertical direction of the bound portion, are obtained.

Two points PaL and PaR, which are indicated by small solid circles in FIG. 8, are positions on Line A that require correction of the luminance of the shadow, that is, points on the outline of the shadow. Similarly, points PbL and PbR are points on the outline of the shadow at the position of Line B. Since the points PaL and PbL are points on the left half of the outline of the shadow, the coordinates of two points PcL and PdL (indicated by small hollow circles in FIG. 8) that crosses the range of the document are obtained by extending a line connecting the points PaL and PbL through collinear approximation of the outline. More specifically, a coordinate in the horizontal direction in FIG. 8 is denoted as "i" and a coordinate in the vertical direction is denoted as "j". The coordinates (i, j) of each point are represented as follows:

PnL=(InL, JnL), where n=a, b, c, d

Upper and lower points on the left half of the outline of the shadow on the document can be obtained by the following expressions:

$$IcL = IaL + (IbL - IaL) \times (JbL - JcL)/(JbL - JaL) \quad \text{(Expression 1)}$$

$$IdL = IaL + (IbL - IaL) \times (JbL - JdL)/(JbL - JaL) \quad \text{(Expression 2)}$$

By using the same denotation for the right half of the outline of the shadow, upper and lower points on the right half of the outline of the shadow on the document can be obtained by the following expressions:

$$IcR = IaR + (IbR - IaR) \times (JbR - JcR)/(JbR - JaR) \quad \text{(Expression 3)}$$

$$IdR = IaR + (IbR - IaR) \times (JbR - JdR)/(JbR - JaR) \quad \text{(Expression 4)}$$

Since, in order to simplify the configuration of the correction value generation circuit 1022, a range to which the process for correcting the luminance of the shadow is applied is configured to have a rectangular shape including the region of the shadow a left end position IL and a right end position IR of the correction region can be obtained by the following expressions:

$$IL = \min(IcL, IdL) \quad \text{(Expression 5)}$$

$$IR = \max(IcR, IdR) \quad \text{(Expression 6)}$$

It is to be noted that min( ) and max( ) are operators that retrieve a minimum value and a maximum value, respectively.

Figure 4A:
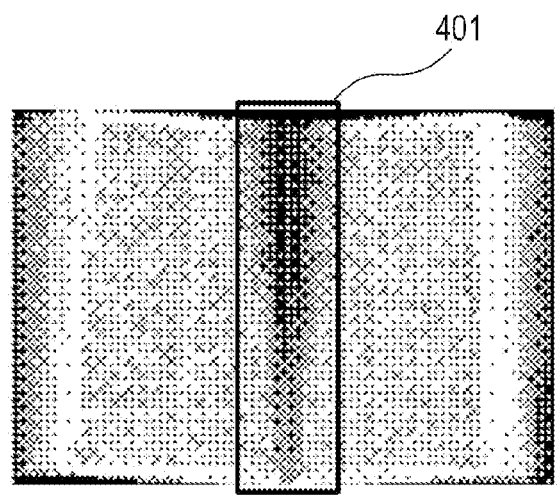
FIGS. 4A and 4B are diagrams illustrating the relationship between the correction process blocks and a correction value calculation region around a grid point.
Figure 4B:
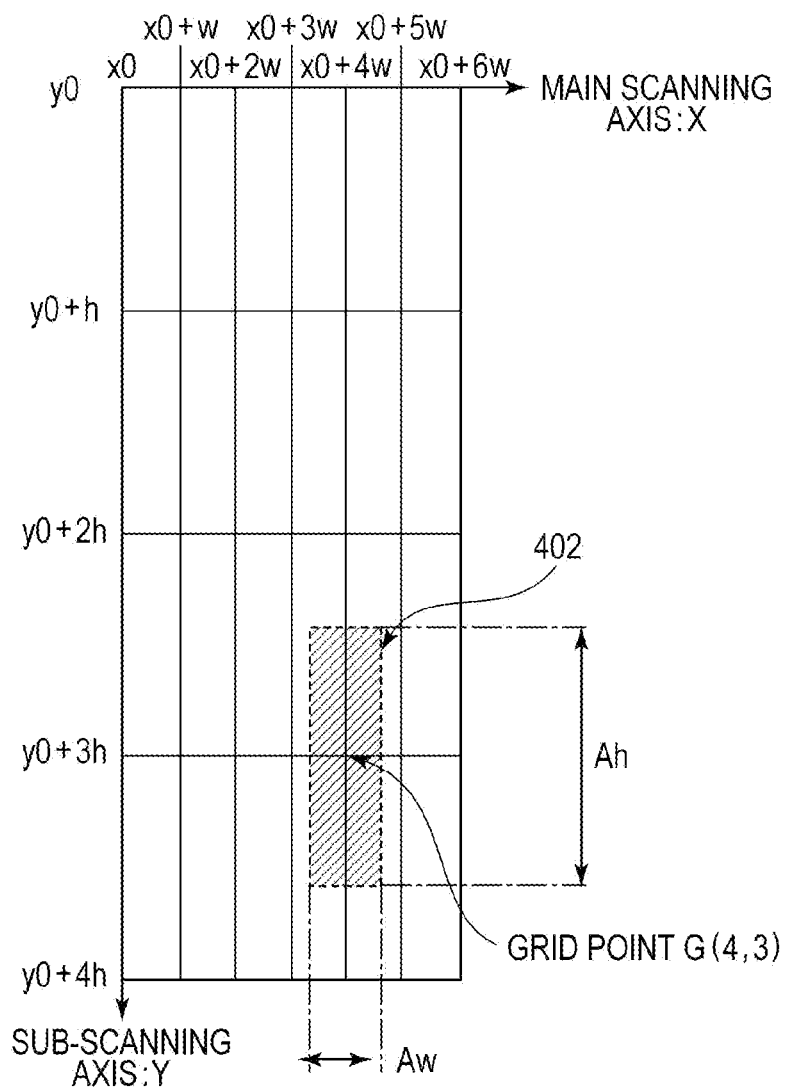

As a result, the range of a rectangular shadow region 802 is extracted as a region in which the shadow is corrected. A process will be described with reference to FIGS. 4A and 4B in which the rectangular region extracted in step 205 is divided into a plurality of correction process blocks by the grid lines (206) and the correction values of the grid points are calculated (207) and stored in the correction value table (208). FIG. 4A is an example of an image of the bound document when the bound document is opened. A region 401 illustrated in FIG. 4A is a rectangular region including the range of a shadow having the shape of a trapezoid in the bound portion and corresponds to the rectangular region 802 in the correction value distribution diagram of FIG. 8. The rectangular correction region 401 is divided by grid lines that are parallel to the horizontal direction (hereinafter referred to as an "X direction") of the image and to the vertical direction (hereinafter referred to as a "Y direction") of the image as illustrated in FIG. 4B.

In general, a document disposed on the document table has an inclination. Therefore, from among the grid lines, the direction of grid lines having a smaller angle relative to the direction of the seam is called the "direction of grid lines along the seam". In FIG. 4B, the Y direction is the direction along the seam. FIG. 4B is a diagram illustrating the region of the shadow divided, by the grid lines, into correction process blocks each having a length of h in the Y direction and a width of w in the X direction. The size h and w of the correction process blocks is selected in step 206 such that the shadow can be effectively corrected. Details of the correction process will be described later with reference to FIG. 1. Boundary lines between the correction process blocks are the grid lines and corners of the correction process blocks are the grid points. The correction value of each grid point is held as a value in the two-dimensional correction value table.

The size h and w of the correction process blocks corresponds to the intervals between the grid lines in the length direction and the width direction, respectively. The grid lines in the length direction and the grid lines in the width direction are perpendicular to each other. The correction value of each grid point is calculated from the luminance correction values of pixels included in a rectangular region having each grid point as the center (step 207). For example, the correction value of a grid point G (4, 3) is calculated from the arithmetic average of the luminance correction values in a correction value calculation region (a hatched rectangular region 402) having a length of Ah and a width of Aw. In addition, in order to make differences between the correction values of adjacent grid points small, the size Ah and Aw may be larger than the intervals h and w between the grid points. That is, the size Ah and Aw are represented by the following expressions:

$$Ah = h + 2m \quad \text{(Expression 7)}$$

$$Aw = w + 2n \quad \text{(Expression 8)}$$

It is to be noted that m and n are constants that are experimentally selected in advance under conditions of $0 \leq m < (h/2)$ and $0 \leq n < (w/2)$, respectively. When the correction values of all the grid points have been calculated and stored in the correction value table, the shadow luminance correction circuit 1020 is set such that correction will be performed and step 208 ends. In order for a resultant image after the correction in the range to which the correction of the shadow is applied to smoothly connect to images in adjacent regions outside the correction region, the grid points are arranged in such a way as to cover a range larger than the shadow correction region extracted in step 205 by one block on each side.

After the preparation of the shadow luminance correction circuit 1020 is completed in step 208 or 209, the main scanning begins (210). The shadow luminance correction circuit 1020 corrects the region of the shadow in the read image data in accordance with the setting thereof that has been set, the correction value table, and the like, such that the region of the shadow becomes brighter (211). Image data after the correction of the luminance of the shadow obtained through the above-described process is output from the input image processing circuit 908. The image data is then saved to a memory card, subjected to copy printing, transmitted to a personal computer (PC) output, or the like (212), and the process for correcting the luminance of the shadow is completed.

Next, a process for selecting the size of the correction process blocks executed in step 206 will be described with reference to a flowchart of FIG. 1 and to FIG. 4A. In order to compare local luminance change characteristics in the X direction and local luminance change characteristics in the Y direction within the region of the shadow, the rectangular region 401 including the shadow is divided into square regions (step 101). Because the size s of the square blocks is to be used as an initial value of the length of short sides of the correction process blocks in a later step, the rectangular region 401 is divided such that the number of regions is tens to hundreds of times larger than the number of grid points that can be used in the two-dimensional table. Next, the absolute values of the amount of change in the correction values in each square block are calculated in terms of the horizontal direction (X direction) and the vertical direction (Y direction). For example, when each square block has three pixels along one side thereof, a ratio Rij between an absolute value Vx obtained by multiplying each pixel by weighting coefficients illustrated in FIG. 3A and adding up the products and an absolute value Vy obtained by multiplying each pixel by weighting coefficients illustrated in FIG. 3B and adding up the products is calculated for all the square blocks (step 102).

$$Rij=Vx(i,j)/Vy(i,j) \quad \text{(Expression 9)}$$

It is to be noted that "i" is the position of a block in the X direction and "j" is the position of a block in the Y direction. When the size is five pixels, weighting coefficients illustrated in FIGS. 3C and 3D are used. In the example illustrated in FIG. 4A, since the luminance in the region of the shadow in the bound portion is small in the direction (Y direction) along the seam and larger in the direction (X direction) perpendicular to the seam, R has a value larger than 1 in most square blocks. In order to obtain an average characteristic value, a median Rmed of the ratios Rij calculated for all the square block is selected (step 103).

Next, a smallest rectangle having the aspect ratio Rmed, which serves as an initial value for examining the size of the correction process blocks, is obtained (104). The size of short sides may be 1, but because the number of loops in the calculation can be decreased by selecting a value equal to or smaller than the size s of the square blocks at a time when the luminance change characteristics are checked, Aw0=s and Ah0=s×Rmed are used as initial values of the size of the correction process blocks. This size is the reciprocal of an average ratio between the horizontal direction (X direction) and the vertical direction (Y direction) of the absolute values of the amount of change in the correction values in each square block. In addition, with respect to the grid for the division, the intervals between the grid lines in the horizontal direction of the grid lines are s and the intervals between the grid lines in the vertical direction are s×Rmed, which are both regular intervals. Ah0 is rounded to an integer in the calculation.

Aw0 and Ah0 are used as initial values for searching for the size of a largest rectangular block having the number of grid points that can be stored in the correction value table (105). In the following description, Aw and Ah are used as the size of a rectangular block under examination, and Aw=Aw0 and Ah=Ah0. In step 106, the region of the shadow is divided by Aw and Ah. Fractional pixels generated by dividing the region of the shadow by blocks are rounded to one block and, as described above, grid points at which correction is not performed are arranged outside the region of the shadow so that the results of the correction around the boundary lines connect to one another in a natural way.

Next, the number of grid points necessary after the division using Aw and Ah is obtained (107) and whether or not the upper limit of the size of the memory capacity of the correction value table is exceeded is checked (step 108). If the upper limit is exceeded, Aw and Ah are increased to twice (step 109) and the process is repeated from step 106. If the number of grid points is small enough to be stored in the correction value table in step 108, Aw and Ah are adopted as the size of the correction process blocks and the calculation of the size of the correction process blocks is terminated.

In the range of the size Aw×Ah of the correction process blocks selected in the above-described process, a change in the amount of correction in the X direction and a change in the amount of correction in the Y direction are substantially the same. Therefore, it is possible to reduce irregularity in the correction of image data whose luminance has been corrected using the memory capacity of the two-dimensional correction value table most effectively.

Figure 2:
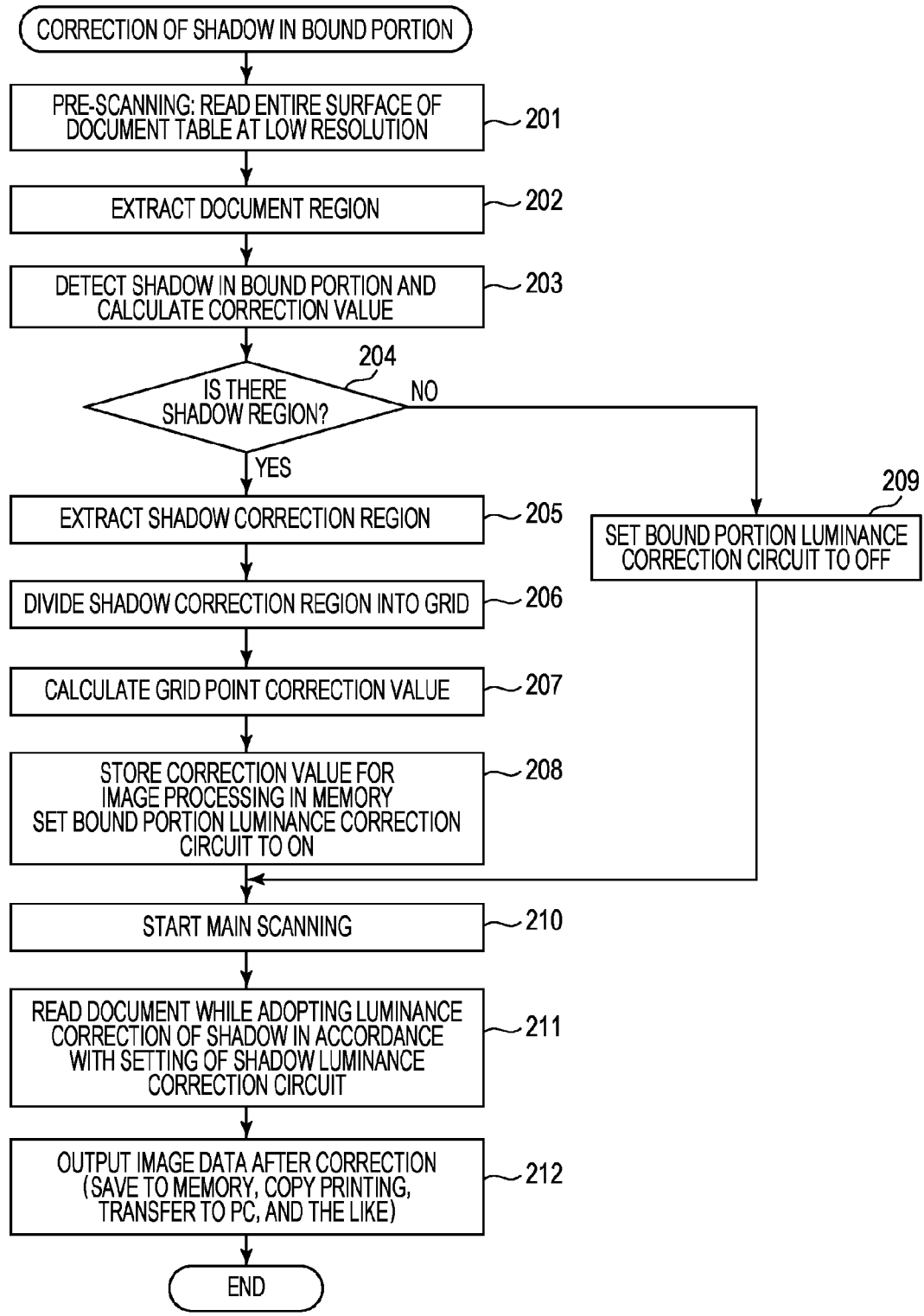
FIG. 2 is a flowchart of the operation of an MFP that reads an image of a document while performing correction of a shadow in a bound portion.

Although an image for an analysis is obtained through the pre-scanning at low resolution in the description of the process flow with reference to FIG. 2, if a memory that can save a high-resolution main scanning image is available, the image for an analysis can be created by reducing the size of a memory image obtained as a result of the main scanning with minimum correction of the image. In this case, a correction value table obtained from the image for an analysis obtained by reducing the size of the main scanning image is set in the input image processing circuit 908, and then the main scanning image in the memory is input to the input image processing circuit 908 and a corrected image after correction of the luminance of the shadow is output. In a case in which two reading operations, namely the pre-scanning and the main scanning, are performed, appropriate correction might not be realized if the way to hold a book document changes. However, when a main scanning image and an image obtained by reducing the size of the main scanning image are available, correction can be performed without generating mismatching in the effects of the correction.

Second Embodiment

Figure 5:
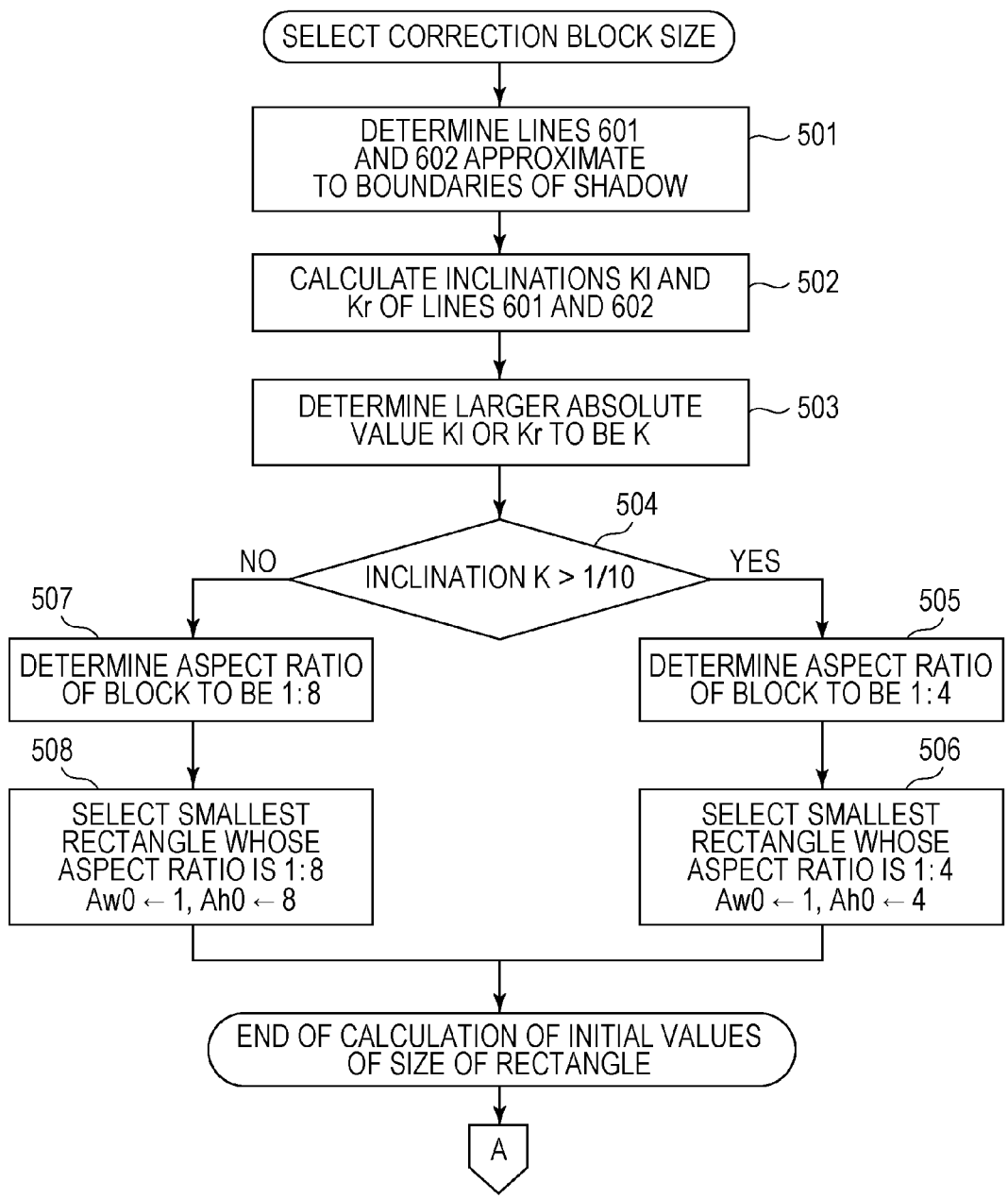
FIG. 5 is a flowchart illustrating a procedure for selecting the size of the correction process blocks according to a second embodiment.
Figure 6:
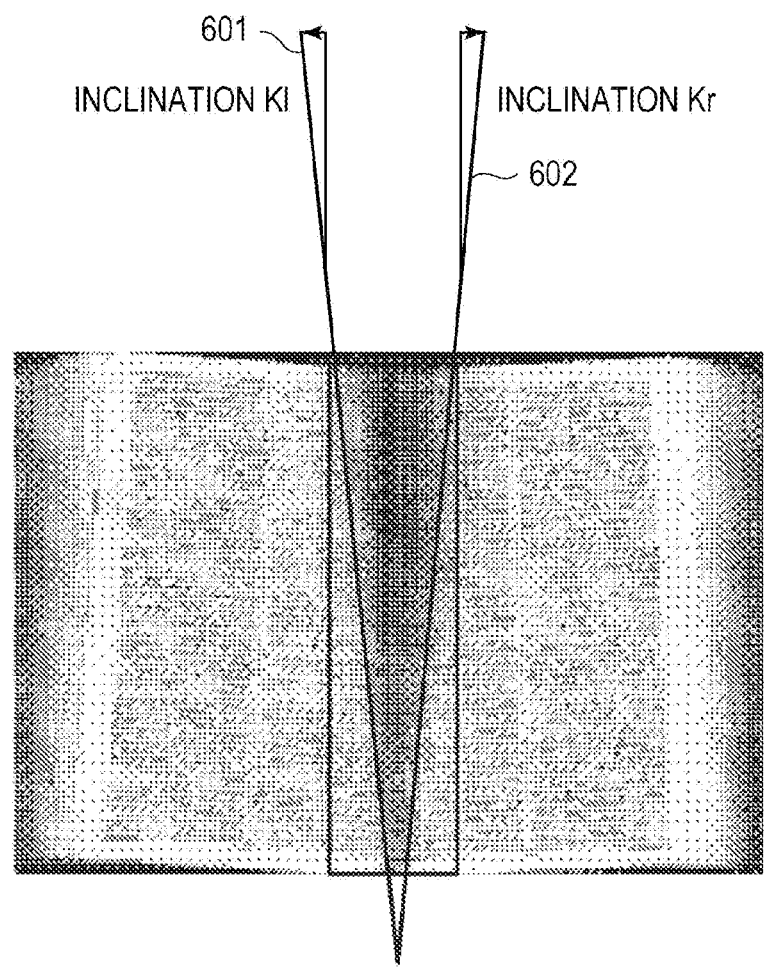
FIG. 6 is a diagram illustrating lines that are approximate to the outline of a shadow generated in the bound portion.

A second exemplary embodiment of the present invention will be described with reference to FIG. 5. A process for selecting the size of the correction process blocks different from that according to the first embodiment will be described in detail with reference to a flowchart of FIG. 5. FIG. 6 is a diagram illustrating a shadow having the shape of a trapezoid generated in the bound portion. In FIG. 6, a line 601 is an approximation of a left side boundary line of the shadow and a line 602 is an approximation of a right side boundary line of the shadow.

In step 501, the lines 601 and 602 are determined. The lines 601 and 602 are determined by, for example, obtaining lines that connect the positions of pixels for which correction values exceed ×1.0 through collinear approximation. Inclinations Kl and Kr of the lines 601 and 602, respectively, are calculated (step 502), and the inclination having a larger absolute value is selected as a value K of the inclination of the shadow (step 503). A threshold value for K (for example, 1/10 in FIG. 5), which has been experimentally obtained in advance, and K are compared (step 504). If K is larger than the threshold value, the aspect ratio of the correction process blocks is determined to be 1:4 (Rmed=4, according to the denotation adopted in the first embodiment) (step 505). Next, the size of a smallest rectangle having the aspect ratio of 1:4, namely Aw0=1 and Ah0=4, is selected as initial values (506). If K is smaller than the threshold value, the aspect ratio is determined to be 1:8 (Rmed=8) (step 507). In this case, the initial values of the size of a rectangle are determined to be Aw0=1 and Ah0=8.

Figure 1:
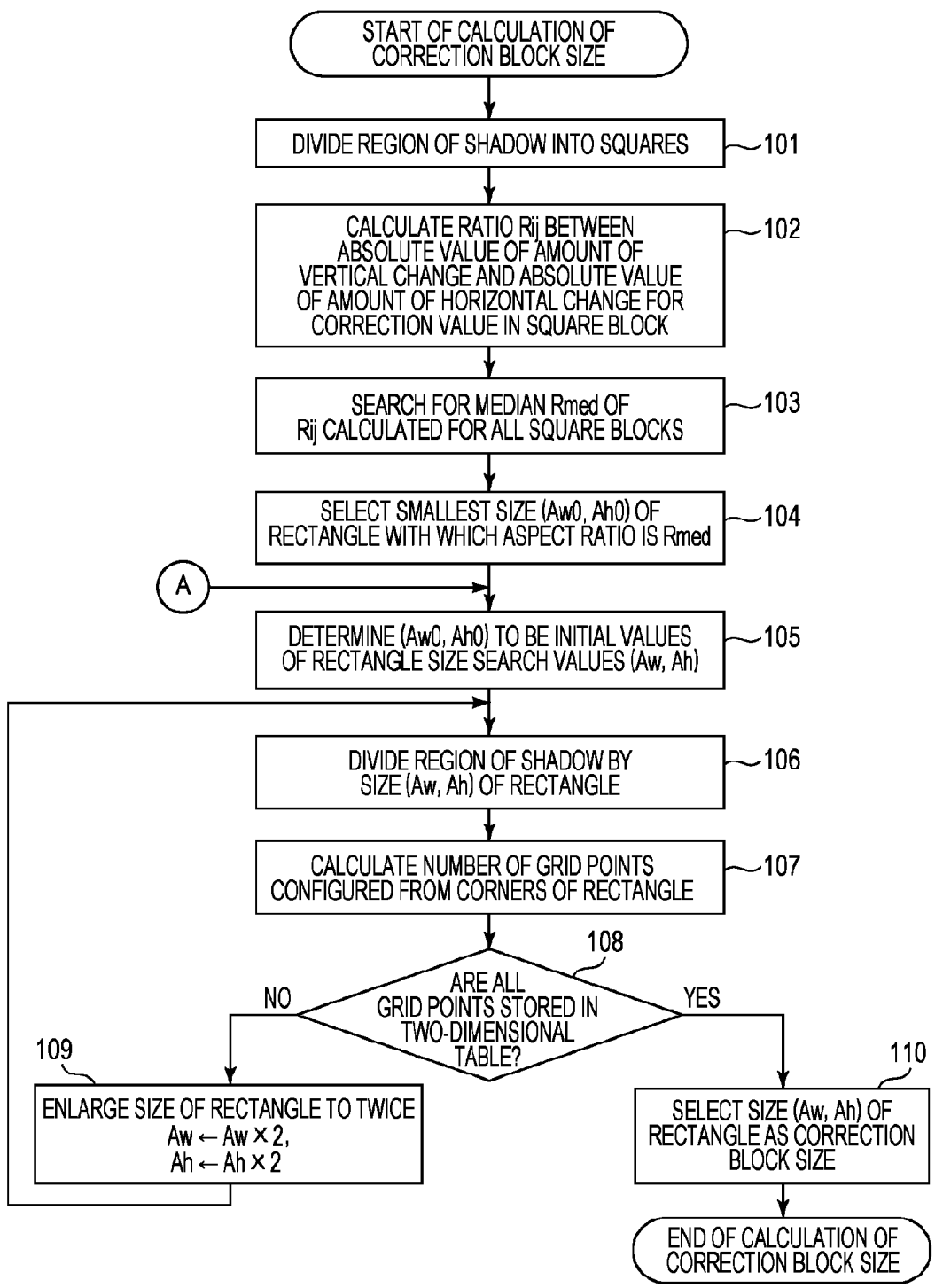
FIG. 1 is a flowchart illustrating a procedure for calculating the size of correction process blocks.

After the initial values Aw0 and Ah0 of the size of the rectangle are determined, the process proceeds to step 105 from a point "A" illustrated in FIG. 1. The processes to be performed after step 105 have been described in the first embodiment and therefore description thereof is omitted here. As described above, when the inclination of the shadow obtained from the outline of the shadow is small, the density of grid points in a direction perpendicular to the seam is increased using elongated correction process blocks and, when the inclination of the shadow is large, the density of grid points along the seam is increased, in order to reduce irregularity generated in an upper portion and a lower portion of each correction process block.

Although lines that are approximate to the outline of a shadow are used as feature values for the inclination of the shadow in this embodiment, a line that is approximate to the center line of the seam may also be used and the largest inclination may be selected. In addition, although two types of blocks are selected in accordance with the degree of inclination, two or more threshold values may be used and an aspect ratio with which the most desirable effects of correction can be obtained under each condition may be experimentally obtained in advance and selected.

As described above, optimal effects of correction can be obtained with a small amount of calculation through a process for switching the aspect ratio of two-dimensional luminance correction process blocks in accordance with the inclination of lines that represent the inclination of the shadow.

Third Embodiment

Figure 7:
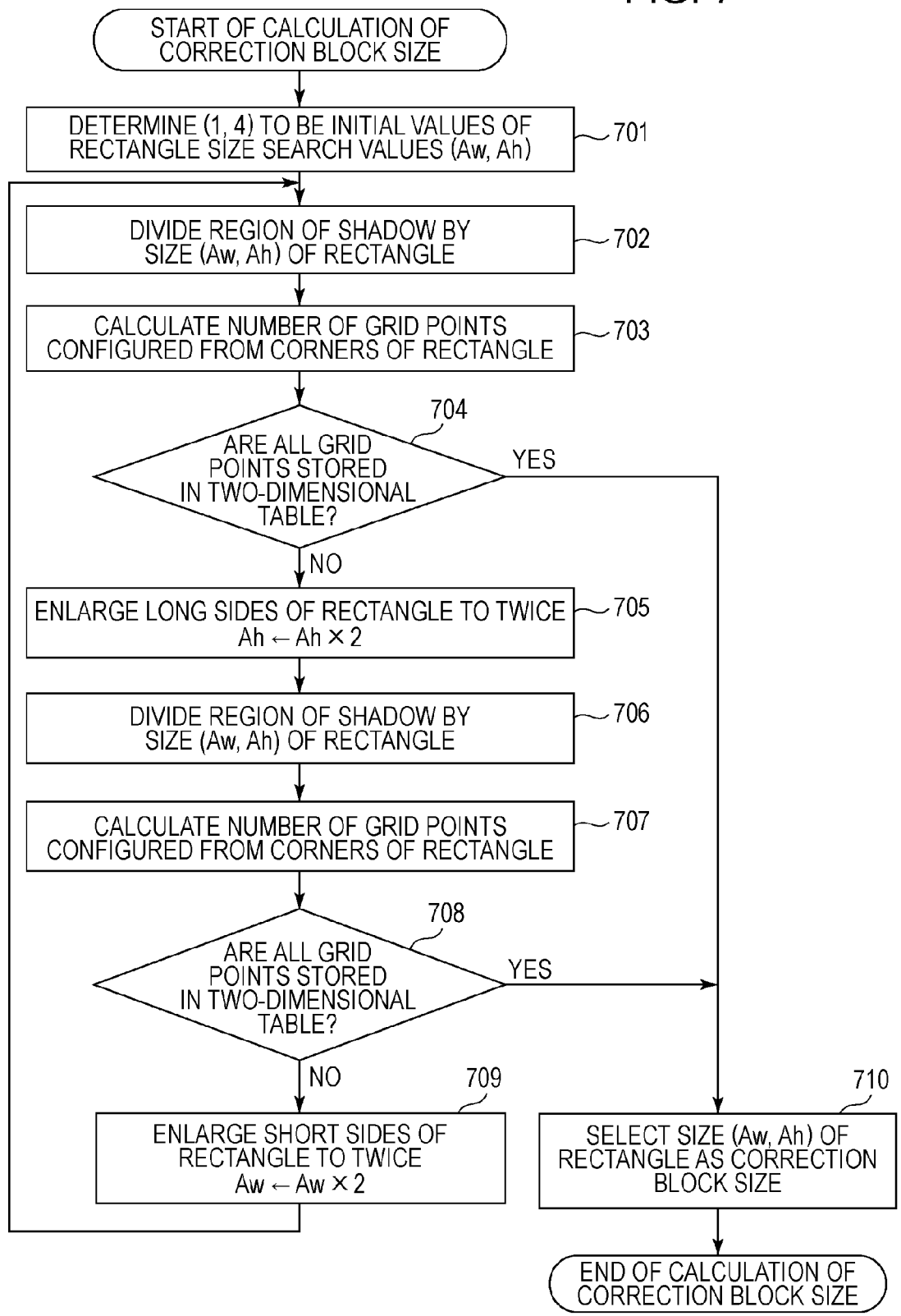
FIG. 7 is a flowchart illustrating a procedure for selecting the size of the correction process blocks according to a third embodiment.

A third exemplary embodiment of the present invention will be described. A process for selecting the size of correction process blocks different from those according to the first and second embodiments will be described in detail with reference to a flowchart of FIG. 7. By referring to information regarding whether the direction of the seam obtained as a result of an analysis of a shadow is close to the vertical direction or the horizontal direction, a size of 4 is selected for the direction along the seam and a size of 1 is selected for the direction perpendicular to the seam as initial values of the size (Aw and Ah) of a rectangle (step 701). A case in which Ah is determined to be long sides will be described hereinafter. In step 702, the region of the shadow is divided using Aw and Ah. Fractional pixels generated by dividing the region of the shadow by blocks are rounded to one block and, as described above, grid points at which correction is not performed are arranged outside the region of the shadow so that the results of the correction around the boundary lines connect to one another in a natural way.

Next, the number of grid points necessary after the division using Aw and Ah is obtained (703) and whether or not the upper limit of the size of the correction value table is exceeded is checked (step 704). If the upper limit is exceeded, only the long sides Ah of the rectangle are enlarged to twice (step 705). The aspect ratio is changed to 1:8 and the region of the shadow is divided using Aw and Ah as in step 702 (706). The number of grid points necessary after the division using Aw and Ah is obtained (707) and whether or not the upper limit of the size of the correction value table is exceeded is checked (step 708). If the upper limit is exceeded, only short sides Aw of the rectangle are enlarged to twice (step 709). The aspect ratio is changed to 1:4 and the process is repeated from step 702. If the number of grid points is small enough to be stored in the correction value table in step 704 or 708, Aw and Ah at that time are selected as the size of the correction process blocks (step 710).

If the size of the correction process blocks is sequentially increased twice by twice as in the above-described embodiments when the size of the correction process blocks is proportionally increased at a constant aspect ratio, the number of grid points is decreased to one-fourth by each size change. Therefore, there may be a case in which up to a ¾ region of the correction value table is not used. According to this embodiment, by increasing the size of the correction process blocks while switching the aspect ratio from 1×4 to 1×8, 2×8, 2×16, 4×16, and so on, a ½ or more region of the correction value table can be used constantly.

In the case of the first or second embodiment, too, the use rate of the correction value table can be improved by changing the length or the width of the correction process blocks to ½ after the determination of a candidate for the size of the correction process blocks and by checking whether or not the number of grid points is small enough to be stored in the correction value table. In this embodiment, effects similar to these results can be obtained with a simple analysis.

It is to be understood that although a configuration in which each step included in the process is executed by the CPU controller 930 has been described in the above description, each step may be configured by a hardware circuit, which is used as a processing unit.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-293022 filed Dec. 28, 2010, which is hereby incorporated by reference herein in its entirety.

What is claimed is:

1. A method for correcting an image used by an image processing apparatus that corrects a shadow in a bound portion included in document image data obtained by reading a bound document, the method comprising the steps of:
    extracting shadow image data including a region of the shadow from the document image data;
    generating, for the shadow image data by determining intervals between grid lines, a grid with which a ratio of changes in luminance between the grid lines in directions that are perpendicular to each other is proportional to a median of ratios of changes in luminance between grid lines in directions that are perpendicular to each other for a first plurality of grids comprising the shadow image data, and that has a number of grid points that can be stored in a capacity of a memory for correction values;
    calculating first correction values that correct luminance of pixels in the shadow image data corresponding to grid points of the grid;
    storing the first correction values in the memory;

calculating second correction values for luminance of the pixels in the shadow image data based on the first correction values of grid points that are close to a position of each pixel, the first correction values being read from the memory; and correcting luminance of the document image data using the first correction values and the second correction values.

2. The method for correcting an image according to claim 1, wherein intervals between grid lines having a smaller angle relative to a direction along a seam in the bound portion are determined to be smaller than other intervals.

3. The method for correcting an image according to claim 2, wherein the intervals between the grid lines are determined to be regular intervals in each direction.

4. The method for correcting an image according to claim 3, wherein the intervals between the grid lines are determined to be a reciprocal of a ratio of changes in luminance of the shadow in each direction of the grid lines in the region of the shadow divided into squares by the grid lines.

5. The method for correcting an image according to claim 3, wherein, if the number of grid points cannot be stored in the capacity of the memory when the region of the shadow has been divided by the predetermined intervals between the grid lines, the intervals of grid lines perpendicular to the intervals between the grid lines are sequentially increased to twice until intervals between the grid lines with which the number of grid points is small enough to be stored is determined.

6. The method for correcting an image according to claim 2, wherein the intervals between the grid lines are selected based on an angle between a line approximate to an outline of the shadow and the grid lines having a smaller angle relative to the direction along the seam in the bound portion.

7. The method for correcting an image according to claim 1, wherein the document image data used in the extracting step is document image data obtained by reading the bound document at low resolution and the document image data used in calculating the second correction values and the correcting step is document image data obtained by reading the bound document at high resolution.

8. The method for correcting an image according to claim 1, wherein the document image data used in calculating the second correction values and the correcting step is document image data obtained by reading the bound document at high resolution and the document image data used in the extracting step is image data obtained by reducing a size of document image data obtained by reading the bound document at high resolution.

9. The method for correcting an image according to claim 1, further comprising the step of:

saving the document image data processed in the correcting step.

10. The method for correcting an image according to claim 1, further comprising the step of:

printing the document image data corrected and output in correcting step.

11. An image processing apparatus that processes document image data obtained by reading a bound document, the image processing apparatus comprising:

an extraction unit configured to extract shadow image data including a region of the shadow on the bound document from the document image data;

a memory configured to store correction values;

a dividing unit configured to determine, based on luminance distribution in the shadow image data extracted by the extraction unit, intervals between grid lines of a grid with which a ratio of changes in luminance between the grid lines in directions that are perpendicular to each other is proportional to a median of ratios of changes in luminance between grid lines in directions that are perpendicular to each other for a first plurality of grids comprising the shadow image data, and that has a number of grid points that can be stored in a capacity of the memory, and to divide the shadow image data into a shape of a grid using the grid;

a first calculator configured to calculate first correction values that correct luminance of pixels in the shadow image data corresponding to grid points of the grid;

a second calculator configured to calculate second correction values for luminance of the pixels in the shadow image data based on the first correction values of grid points that are close to a position of each pixel, the first correction values being read from the memory; and a correction unit configured to correct luminance of the pixels of the shadow image data using the first correction values and the second correction values in order to correct the document image data.

12. A multifunction system comprising:

the processing apparatus according to claim 11;

an image reading apparatus configured to read a bound document and transfer document image data read from the bound document to the image processing apparatus; and a printer configured to print the document image data processed by the image processing apparatus.

13. An apparatus comprising:

a specifying unit configured to specify a region of image data for correcting;

a dividing unit configured to divide the region of the image data specified by the specifying unit into a plurality of rectangular areas of a first size;

a correcting unit configured to correct the image data divided by the dividing unit based on grid points configured from corners of the rectangular areas;

a determining unit configured to determine whether a number of the grid points is not over a predetermined number; and a deciding unit configured to decide a size of the rectangular areas to be divided by the dividing unit based on a determining result by the determining unit, wherein the deciding unit decides that the size of the rectangular areas is the first size in a case where the determining unit determines that the number of the grid points based on the rectangular areas of the first size is not over the predetermined number, and the deciding unit decides that the size of the rectangular areas is a second size which is wider than the first size for further division by the dividing unit so as to reduce the number of the grid points in a case where the determining unit determines that the number of the grid points based on the rectangular areas of the first size is over the predetermined number.

14. The apparatus according to claim 13, wherein the specifying unit is configured to specify a shadow in a bound portion included in a read image which is obtained by reading a bound document by a reading apparatus.

15. The apparatus according to claim 14, wherein the dividing unit is configured to divide the region of the image data based on a direction of the shadow specified by the specifying unit.

16. The apparatus according to claim 14, wherein the dividing unit is configured to divide the region of the image data based on an inclination of a line approximate to an outline of the shadow specified by the specifying unit.

17. The apparatus according to claim 13, wherein the dividing unit is configured to divide the region of the image data based on an amount of change of luminance value of the image data in a horizontal direction and an amount of change of luminance value of the image data in a vertical direction.

18. The apparatus according to claim 13, wherein the predetermined number is a number which can be stored in a correction table for the correcting unit.

\* \* \* \* \*